US012504097B2

(12) United States Patent
Jelken (10) Patent No.: US 12,504,097 B2
(45) Date of Patent: Dec. 23, 2025

(54) CONTROL VALVE AND TRIM ASSEMBLY FOR A CONTROL VALVE

(71) Applicant: FISHER CONTROLS INTERNATIONAL LLC, Marshalltown, IA (US)

(72) Inventor: Shannon E. Jelken, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 67 days.

(21) Appl. No.: 18/199,542

(22) Filed: May 19, 2023

(65) Prior Publication Data

US 2024/0384814 A1    Nov. 21, 2024

(51) Int. Cl.
*F16K 47/08* (2006.01)
*B01D 29/11* (2006.01)
*F16K 1/54* (2006.01)
*F16K 3/24* (2006.01)
*F16K 47/14* (2006.01)

(52) U.S. Cl.
CPC ............ *F16K 47/08* (2013.01); *B01D 29/112* (2013.01); *F16K 1/54* (2013.01); *F16K 3/246* (2013.01); *F16K 47/14* (2013.01)

(58) Field of Classification Search
CPC .......... F16K 47/08; F16K 47/14; F16K 3/246; F16K 1/54; F16K 47/02; B01D 29/112
See application file for complete search history.

(56) References Cited

U.S. PATENT DOCUMENTS

| 10,487,961 | B2 | 11/2019 | Eilers et al. |
| 2006/0049375 | A1* | 3/2006 | Gossett ................. F16K 25/005 251/357 |
| 2016/0123477 | A1* | 5/2016 | Eilers ....................... F16K 1/54 137/601.18 |
| 2019/0101229 | A1* | 4/2019 | Eilers ...................... F16K 3/246 |
| 2020/0003334 | A1* | 1/2020 | McCormick ............ F16K 3/246 |

FOREIGN PATENT DOCUMENTS

GB           1288469 A  *  9/1972  ............. B01D 33/06

* cited by examiner

*Primary Examiner* — Atif H Chaudry
(74) *Attorney, Agent, or Firm* — MARSHALL, GERSTEIN & BORUN LLP (57) ABSTRACT

A control valve includes a body having an inlet and an outlet, a valve seat positioned in a passageway of the body between the inlet and the outlet, and a valve plug movable between a closed position and an open position. A trim assembly is disposed within the body to provide guidance for the valve plug and to condition a flow of fluid through the control valve. The trim assembly includes a top portion and a bottom portion. A plurality of ribs extend between the top portion and the bottom portion and a plurality of arcuate lattice segments are removably secured between the top portion and the bottom portion and separated from adjacent lattice segments by a rib of the plurality of ribs. Each lattice segment has a plurality of passages that extend between an inner surface and an outer surface of the lattice segment.

18 Claims, 8 Drawing Sheets

CONTROL VALVE AND TRIM ASSEMBLY FOR A CONTROL VALVE

FIELD OF THE DISCLOSURE

This disclosure relates generally to control valves and, more particularly, to trim assemblies for control valves.

BACKGROUND

In typical control valves, a trim assembly may be used to condition the flow of fluid through the control valve, reduce noise, cavitation, and turbulence through the control valve, and in some applications can also be used to provide guidance for a fluid control member or valve plug as the valve plug moves between closed and open positions. In some applications, the trim assembly can be a lattice structure manufactured using Additive Manufacturing Technology that provides a tortured, or non-linear, flow path for passages through the lattice structure or by varying the cross-sectional diameter of the passages as they pass through the wall of the lattice structure.

When using lattice structures for trim assemblies in control valves, manufacturing the internal diameters of the cages of the trim assemblies causes material debris that can plug the flow passages in the lattice structure. Since the flow passages in lattice structures can be small, the process of manufacturing these designs can be detrimental to the flow capacity of the lattice structure without extensive mitigation and/or cleaning processes.

In addition, print beds used in Additive Manufacturing Technology currently have limited print bed sizes and the production of lattice structure for large valves can easily exceed the print bed size of the available machinery.

Finally, since the flow passages in lattice structures can be small, plugging or erosion of the flow passages through the lattice structure during use can change the flow capacity and noise abatement efficacy of the lattice structure and requires the replacement of the entire cage and lattice structure.

BRIEF SUMMARY OF THE DISCLOSURE

In accordance with one exemplary aspect of the present invention, a control valve comprises a body having an inlet and an outlet, a valve seat positioned in a passageway of the body between the inlet and the outlet, and a valve plug positioned within the body and movable between a closed position, in which the valve plug sealingly engages the valve seat, and an open position, in which the valve plug is spaced away from the valve seat. A trim assembly is disposed within the body to provide guidance for the valve plug and to condition a flow of fluid through the control valve. The trim assembly comprises a top portion and a bottom portion, opposite the top portion, and a plurality of ribs extending between the top portion and the bottom portion. A plurality of arcuate lattice segments are removably secured between the top portion and the bottom portion and separated from adjacent lattice segments by a rib of the plurality of ribs, each lattice segment of the plurality of lattice segments having a plurality of passages that extend between an inner surface of the lattice segment and an outer surface of the lattice segment.

In further accordance with any one or more of the foregoing exemplary aspects of the present invention, the control valve may further include, in any combination, any one or more of the following preferred forms.

In one preferred form, each of the plurality of ribs comprises a first slot on a first side of the rib and a second slot on a second side of the rib, opposite the first side, and each of the plurality of lattice segments comprises a first longitudinal protrusion extending along a first side of the lattice segment and a second longitudinal protrusion extending along a second side of the lattice segment. The first and second longitudinal protrusions are configured to engage the first slot and the second slot in adjacent ribs.

In another preferred form, the inner surface of each of the plurality of lattice segments is recessed from an inner diameter of the trim assembly such that the valve plug does not engage the inner surface.

In another preferred form, each of the plurality of lattice segments includes a first portion configured to provide a first fluid conditioning and an axially positioned second portion configured to provide a second fluid conditioning, different than the first fluid conditioning.

In another preferred form, each of the plurality of lattice segments includes a first portion configured to provide a first fluid conditioning and a radially positioned second portion configured to provide a second fluid conditioning, different that the first fluid conditioning.

In another preferred form, the bottom portion and the plurality of ribs are a single, integral, unitary piece.

In another preferred form, the top portion and the plurality of ribs are a single, integral, unitary piece.

In another preferred form, the top portion includes an axial extending cylindrical plug guide.

In accordance with another exemplary aspect of the present invention, a trim assembly for a control valve comprises a top portion and a bottom portion, opposite the top portion, and a plurality of ribs extending between the top portion and the bottom portion. A plurality of arcuate lattice segments are removably secured between the top portion and the bottom portion, and separated from adjacent lattice segments by a rib of the plurality of ribs. Each of the plurality of lattice segments have a plurality of passages that extend between an inner surface of the lattice segment and an outer surface of the lattice segment.

In further accordance with any one or more of the foregoing exemplary aspects of the present invention, the trim assembly may further include, in any combination, any one or more of the following preferred forms.

In one preferred form, each of the plurality of ribs comprises a first slot on a first side of the rib and a second slot on a second side of the rib, opposite the first side and each of the plurality of lattice segments comprises a first longitudinal protrusion extending along a first side of the lattice segment and a second longitudinal protrusion extending along a second side of the lattice segment. The first and second longitudinal protrusions are configured to engage the first and second slots in adjacent ribs.

In another preferred form, the inner surface of each of the plurality of lattice segments is recessed from an inner diameter of the trim assembly.

In another preferred form, each of the plurality of lattice segments includes a first portion configured to provide a first fluid conditioning and an axially positioned second portion configured to provide a second fluid conditioning, different than the first fluid conditioning.

In another preferred form, each of the plurality of lattice segments includes a first portion configured to provide a first fluid conditioning and a radially positioned second portion configured to provide a second fluid conditioning, different that the first fluid conditioning.

In another preferred form, the bottom portion and the plurality of ribs are a single, integral, unitary piece.

In another preferred form, the top portion and the plurality of ribs are a single, integral, unitary piece.

In another preferred form, the top portion includes an axial extending cylindrical plug guide.

In accordance with another exemplary aspect of the present invention, a method of assembling a trim assembly for a control valve comprises the steps of: inserting a plurality of lattice segments into a first trim section, wherein the first trim section includes a base portion and a plurality of ribs extending from the base portion, each of the plurality of lattice segments has a plurality of passages that extend between an inner surface of the lattice segment, and each of the plurality of lattice segments is configured to be removably inserted between two corresponding ribs of the plurality of ribs and is separated from adjacent lattice segments by a rib of the plurality of ribs; and securing a second trim section to the first trim section such that the plurality of lattice segments are removably secured between the first trim section and the second trim section.

In further accordance with any one or more of the foregoing exemplary aspects of the present invention, the method may further include, in any combination, any one or more of the following preferred forms.

In one preferred form, each of the plurality of ribs comprises a first slot on a first side of the rib and a second slot on a second side of the rib, opposite the first side and each lattice segment comprises a first longitudinal protrusion extending along a first side of the lattice segment and a second longitudinal protrusion extending along a second side of the lattice segment. The first and second longitudinal protrusions are configured to engage the first and second slots in adjacent ribs.

In another preferred from, each of the plurality of lattice segments includes a first portion configured to provide a first fluid conditioning and an axially positioned second portion configured to provide a second fluid conditioning, different than the first fluid conditioning.

In another preferred from, each of the plurality of lattice segments includes a first portion configured to provide a first fluid conditioning and a radially positioned second portion configured to provide a second fluid conditioning, different that the first fluid conditioning.

DETAILED DESCRIPTION

The examples disclosed herein relate to control valves and trim assemblies for control valves. The example trim assemblies disclosed herein include segmented lattice segments for noise/cavitation abatement. The use of segmented lattice structures allows the use of lattice structures manufactured using Additive Manufacturing Technologies while avoiding damage or plugging of the lattice segments during manufacture, for trim assemblies for any size valve, and for easy maintenance and replacement of individual lattice segments, rather than replacement of the entire trim assembly.

For example, the use of lattice segments that can be inserted into a frame allows the lattice segments to be manufactured separate from the frame. The frame could be almost completely machined before the lattice segments are installed into the frame, which could greatly reduce the introduction of debris into the lattice structure during manufacture of the frame. This reduces the need for debris mitigation and/or cleaning operations to prevent fouling of the flow area of the trim assembly.

In addition, the use of multiple lattice segments, each of which only extends around a portion of the circumference of the trim assembly, allows the use of Additive Manufacturing Technology to produce the lattice segments regardless of the size of the valve and the size limitations of the print bed of the additive manufacturing process.

Finally, the use of lattice segments allows faster, simpler, and less expensive repair and replacement should the trim assembly become worn or damaged. For example, if one of the lattice segments is determined to be plugged and/or damaged, the individual lattice segment could be swapped removed and replaced, rather than replacing the entire trim assembly. Similarly, if the end user decides to change the characteristics of the trim assembly, either flow capacity and/or noise abatement level, they can simply swap out the lattice segments without having to replace the entire trim assembly.

Although described herein as used in sliding stem control valves, the concepts described herein are also applicable to rotary valves, other attenuators, and in-line diffuser plates.

Figure 1:
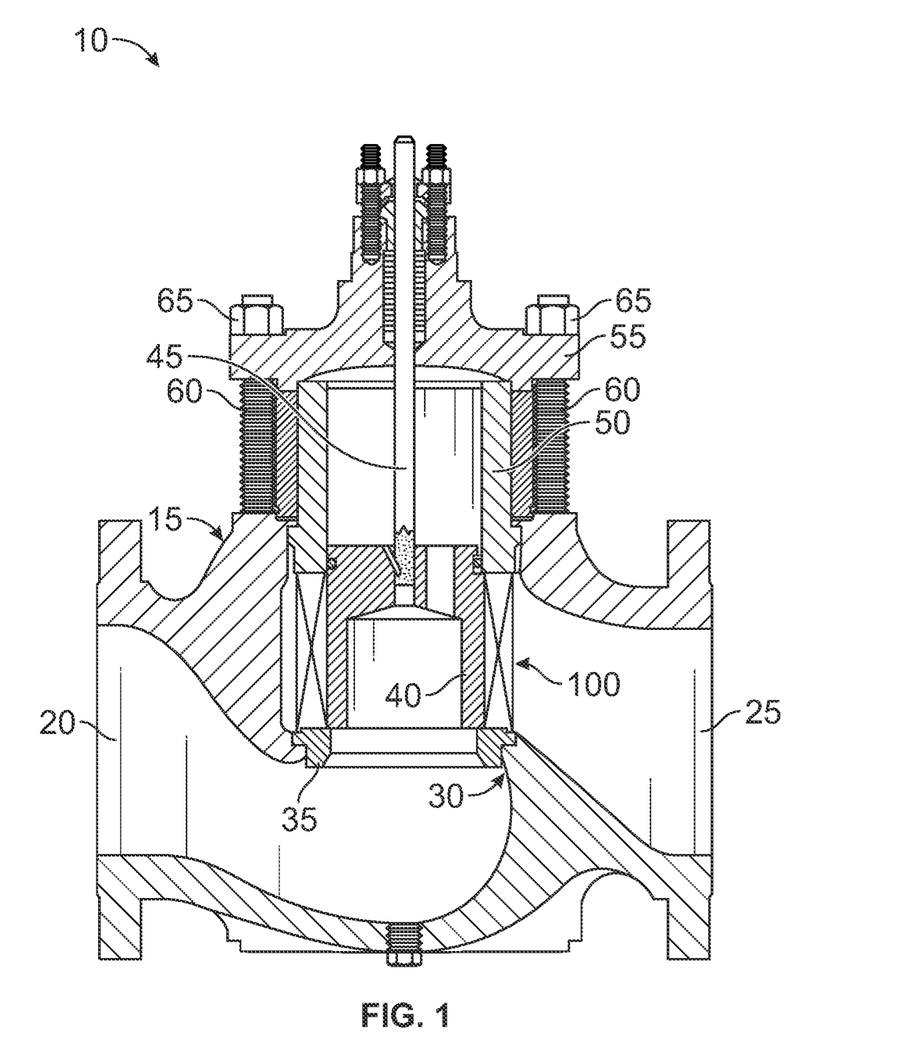
FIG. 1 illustrates a cross-sectional view of a first example control valve.

Referring to FIG. 1, a first example control valve 10 is shown, which in the example shown in a sliding stem control valve. Control valve 10 generally includes a body 15 having an inlet 20, an outlet 25, and a passageway 30 disposed between inlet 20 and outlet 25. A valve seat 35 is disposed in passageway 30 between inlet 20 and outlet 25. A fluid control member, such as valve plug 40, is positioned within body 15 and interacts with valve seat 35 to control fluid flow through body 15, such that valve plug 40 is movable between a closed position in which valve plug 40 sealingly engages valve seat 35 and an open position in which valve plug 40 is spaced away from valve seat 35. A trim assembly 100 is disposed within body 15 to provide guidance for valve plug 40 and to condition a flow of fluid through control valve 10. A stem 45 is connected to valve plug 40 at one end and to an actuator (not shown) at another end. The actuator controls movement of valve plug 40 within trim assembly 100. A plug guide 50 is positioned within body 15 adjacent trim assembly 100 to also provide guidance for valve plug 40. A top cover 55 is secured to body 15, for example via threaded members 60 and nuts 65, and secures trim assembly 100 and plug guide 50 within control valve 10 by clamping trim assembly 100 and plug guide 50 between valve seat 35 and top cover 55.

Figure 2:
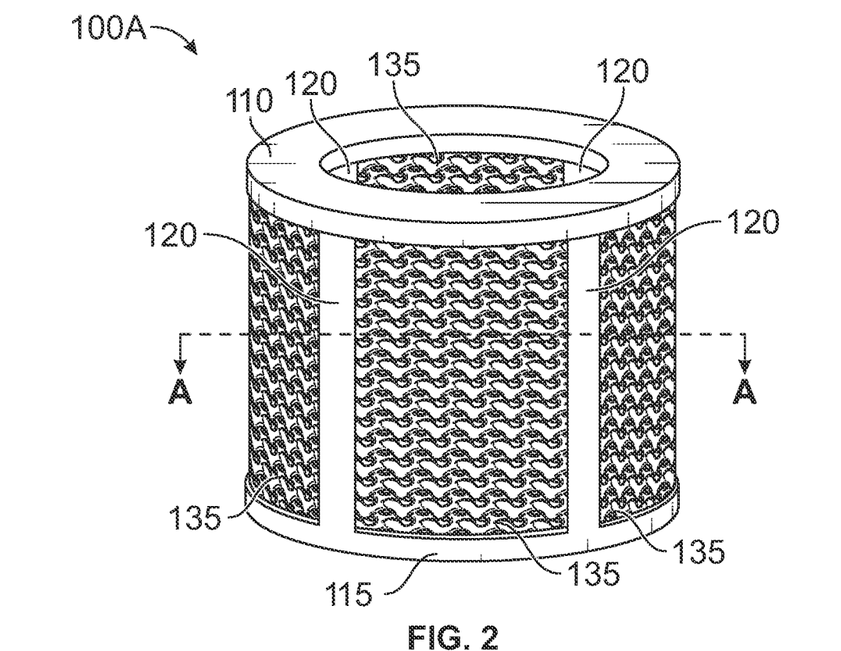
FIG. 2 illustrates a perspective view of a first example trim assembly that can be used in the control valve of FIG. 1.
Figure 3:
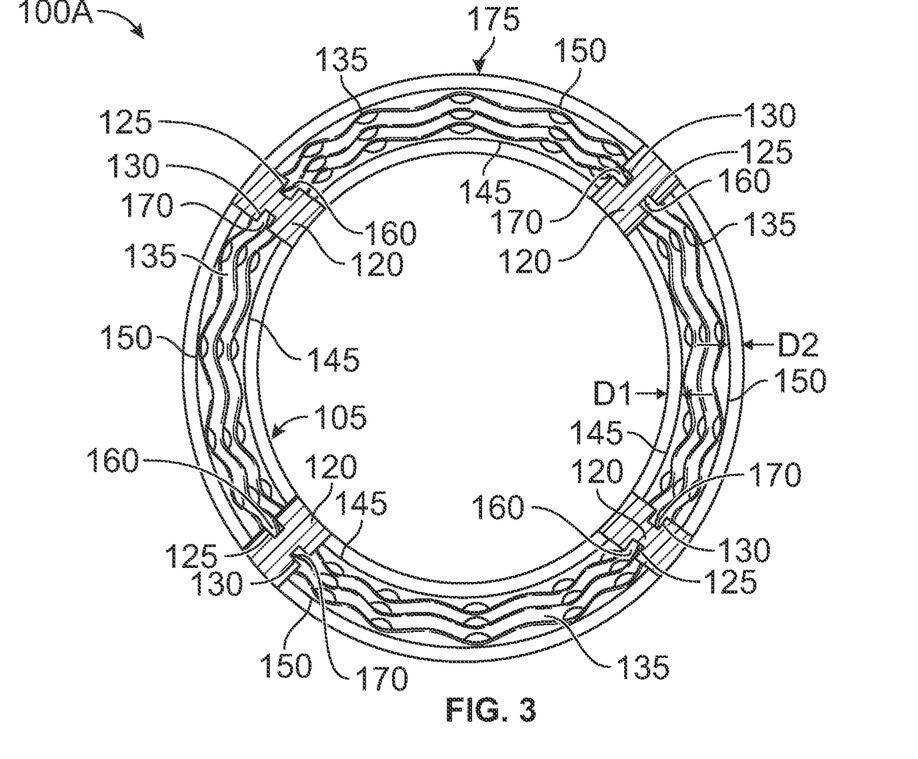
FIG. 3 illustrates a cross-sectional view of the trim assembly of FIG. 2 taken along line A-A in FIG. 2.
Figure 4:
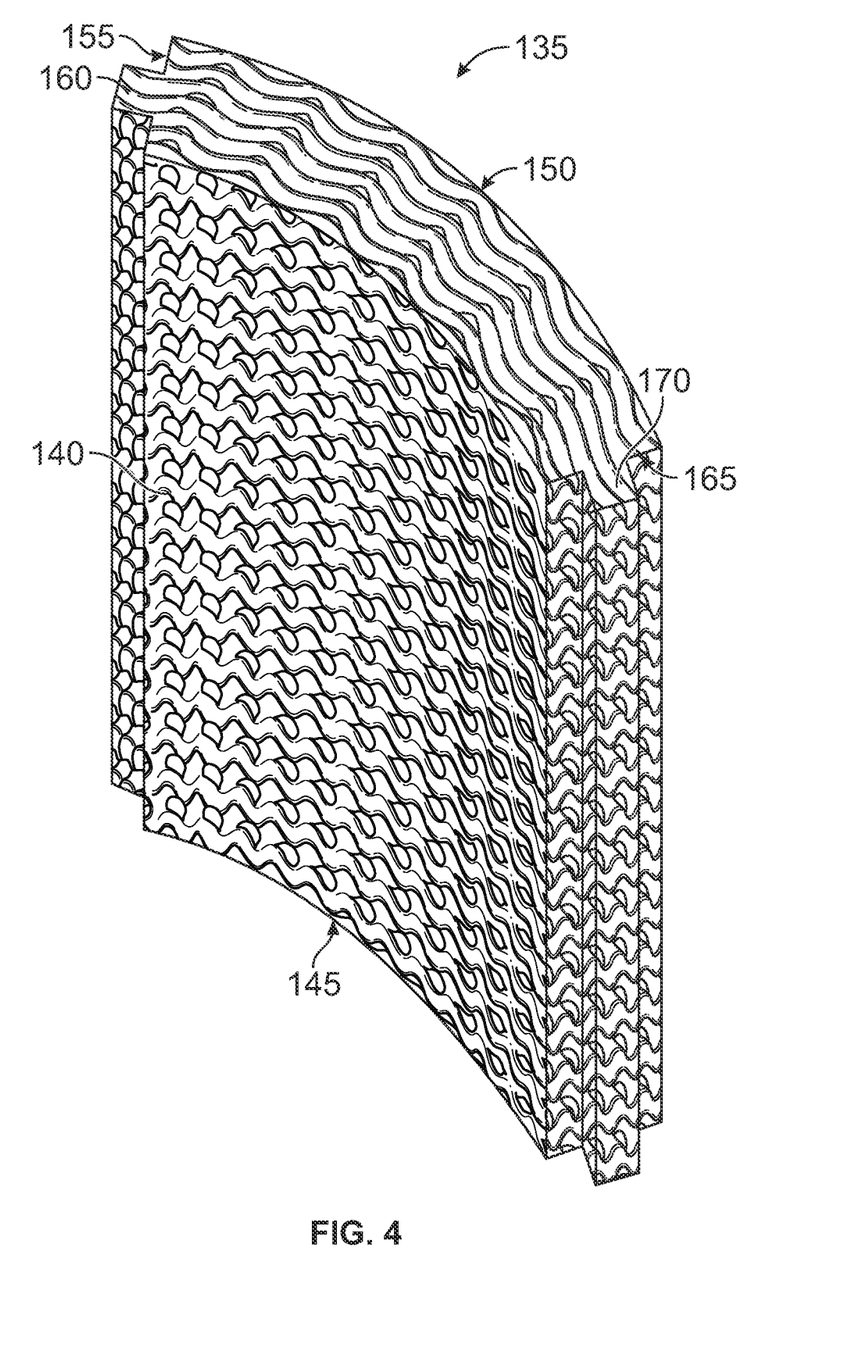
FIG. 4 illustrates a perspective view of an example lattice segment of the trim assembly of FIG. 2.

Referring to FIGS. 2-4, a first example trim assembly 100A is shown that can be used with control valve 10 to condition the flow of fluid through control valve 10 by reducing noise, turbulence, and cavitation. Trim assembly 100A generally includes a top portion 110, a bottom portion 115, opposite top portion 110, and a plurality of ribs 120 extending between top portion 110 and bottom portion 115. In the example shown, bottom portion 115 and ribs 120 are a single, integral, unitary part, ribs 120 extend from bottom portion 115, and top portion 110 is removably secured to ribs 120. Alternatively, top portion 110 and ribs 120 could be a single, integral, unitary part, ribs 120 can extend from top portion 110, and bottom portion 115 could be removably secured to ribs 120. In addition, top portion 110, bottom portion 115, and ribs 120 could each be separate parts and both top portion 110 and bottom portion 115 could be removably secured to ribs 120.

A plurality of arcuate lattice segments 135 are removably secured between top portion 110 and bottom portion 115 and each of the plurality of lattice segments 135 is separated from adjacent lattice segments 135 by one of the ribs 120. Lattice segments 135 can be any type of lattice structure appropriate for a given application. For example, lattice segments can be manufactured using Additive Manufacturing Technology, such as direct metal laser sintering, full melt powder bed fusion, etc. Using an Additive Manufacturing Technology process, the 3-dimensional design of lattice segment 135 is divided into multiple layers, for example layers approximately 20-50 microns thick. A powder bed, such as a powder-based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed lattice segment 135. Using an Additive Manufacturing Technology process to manufacture lattice segment 135 allows the freedom to produce passages having various shapes, geometries, and features that are not possible using current standard casting or drilling techniques. Alternatively, lattice segment 135 could manufactured using any appropriate technique, such as drilled hole tubular sheets, stacked plates, etc. Each lattice segment 135 has a plurality of passages 140 that extend between an inner surface 145 of lattice segment 135 to an outer surface 150 of lattice segment 135 and can be formed by triply periodic surfaces that are gyroids or gyroid-like, as discussed in U.S. Pat. No. 10,487,961, issued on Nov. 26, 2019, and entitled "Control Valve Trim Assembly", which is incorporated by reference herein in its entirety.

To align and secure lattice segments 135 between adjacent ribs 120, each lattice segment 135 includes a first longitudinally extending protrusion 160 extending along a first side 155 of lattice segment 135 and a second longitudinally extending protrusion 170 extending along a second side 165 of lattice segment 135. In addition, each rib 120 includes a first slot 125 extending longitudinally along a first side of rib 120 and a second slot 130 extending longitudinally along a second side of rib 120, opposite first side. First and second longitudinal protrusions 160, 170 are configured to engage first slot 125 and second slot 130 on adjacent ribs 120 (e.g., first longitudinal protrusion 160 would engage first slot 125 in rib 120 located adjacent first side 155 of lattice segment 135 and second longitudinal protrusion 170 would engage second slot 130 in another rib 120 located adjacent second side 165 of lattice segment 135). As shown, first and second longitudinally extending protrusions 160, 170 each have a generally rectangular cross-sectional shape. However, first and second longitudinally extending protrusions 160, 170 can have any cross-sectional shape desired. In addition, rather than first and second longitudinally extending protrusions 160, 170 being on lattice segments 135 and first and second slots 125, 130 being on ribs 120, the longitudinally extending protrusions could be on ribs 120 and the slots could be formed in lattice segments 135.

In the example shown, inner surfaces 145 of lattice segments 135 is recessed from an inner diameter 105 of trim assembly 100A by a distance D1 so that valve plug 40 does not engage inner surfaces 145 of lattice segments 135 as valve plug 40 moves withing trim assembly 100A. This recess of inner surfaces 145 of lattice segments 135 allows valve plug 40 to ride on the inner surfaces of ribs 120, top portion 110, and bottom portion 115 and protects lattice segments from wear and damage that can occur if valve plug 40 were to contact lattice segments 135 during movement of valve plug 40 withing trim assembly 100A. If desired, outer surfaces 150 of lattice segments 135 could also be recessed from an outer diameter 175 of trim assembly 100A by a distance D2. This recess of outer surfaces 150 of lattice segments 135 can assist in protecting lattice segments during assembly, installation, maintenance, replacement, etc.

Figure 12:
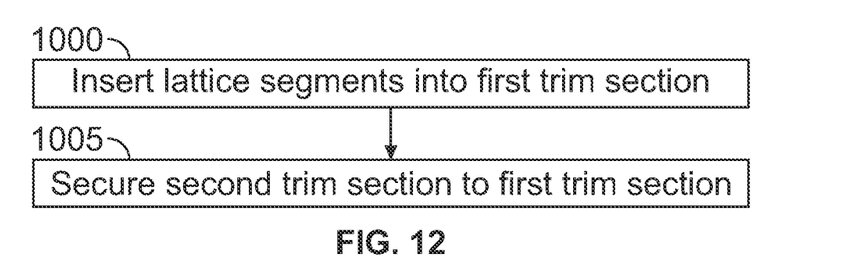
FIG. 12 illustrates a flowchart of an example method of assembling a trim assembly.

Referring to FIG. 12, to assemble trim assembly 100A, a plurality of lattice segments 135 are first inserted into a first trim section (Step 1000). The first trim section includes a base portion and a plurality of ribs 120 extending from the base portion and each lattice segment 135 is configured to be removably inserted between two corresponding ribs 120 and is separated from adjacent lattice segments 135 by a rib 120. As discussed above, the first trim section could be bottom portion 115, with ribs 120 secured to or integrally and unitarily formed with bottom portion 115 or the first trim section could be top portion 110, with ribs 120 secured to or integrally and unitarily formed with top portion 110. In addition, to align and secure lattice segments 135 between adjacent ribs 120, each lattice segment 135 can include a first longitudinally extending protrusion 160 extending along a first side 155 of lattice segment 135 and a second longitudinally extending protrusion 170 extending along a second side 165 of lattice segment 135. In addition, each rib 120 can include a first slot 125 extending longitudinally along a first side of rib 120 and a second slot 130 extending longitudinally along a second side of rib 120, opposite first side. First and second longitudinal protrusions 160, 170 are configured to engage first slot 125 and second slot 130 on adjacent ribs 120 (e.g., first longitudinal protrusion 160 would engage first slot 125 in rib 120 located adjacent first side 155 of lattice segment 135 and second longitudinal protrusion 170 would engage second slot 130 in another rib 120 located adjacent second side 165 of lattice segment 135). Once the lattice segments 135 have been inserted into the first trim section, a second trim section is removably secured to the first trim section (e.g., via threaded members, shrink fit, guide/engagement features held in place by a clamping load, a seal weld, a tack weld, etc.) such that the lattice segments 135 are removably secured between the first trim section and the second trim section (Step 1005).

Figure 5:
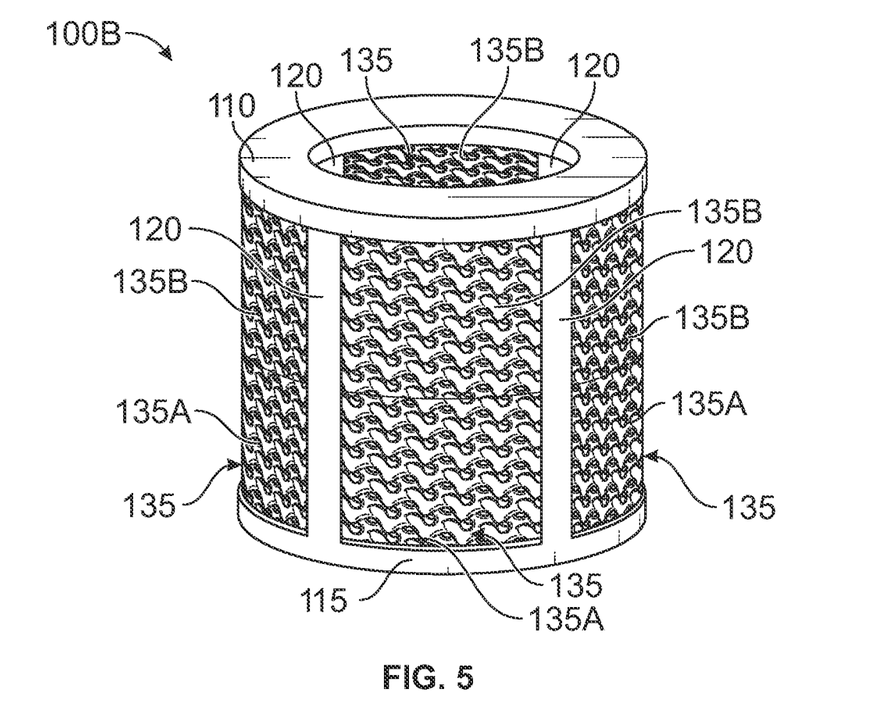
FIG. 5 illustrates a perspective view of a second example trim assembly that can be used in the control valve of FIG. 1.

Referring to FIG. 5, a second example trim assembly 100B is shown that can be used with control valve 10 to condition the flow of fluid through control valve 10. Trim assembly 100B is the same as trim assembly 100A except that each lattice segment 135 includes a first portion 135A and an axially positioned second portion 135B. First portion 135A can provide a first fluid conditioning and second portion 135B can provide a second fluid conditioning, different that the first fluid conditioning. For example, first portion 135A could have a high volume density that yields low flow and high noise abatement as the control valve starts to open and second portion 135B could have a lower volume density that yields higher flow with a lower noise abatement value. Alternatively, first portion 135A and second portion 135B could provide the same fluid conditioning, for example, to create a lattice segment 135 that having a greater height.

Second portion 135B could be a separate lattice portion that is positioned adjacent first portion 135A or could be manufactured integral with first portion 135A. In addition, a solid, non-porous portion can be positioned between first portion 135A and second portion 135B, either as a separate portion or manufactured integral with first portion 135A and second portion 135B, to prevent vertical fluid flow between first portion 135A and second portion 135B. In addition, although shown with a first portion 135A and a second portion 135B, there could be as many axially positioned portions as appropriate for a given application.

Trim assembly 100B is assembled much the same as trim assembly 100A described above (see FIG. 12), except that lattice segments 135 are inserted into the first trim section by inserting first portion 135A of lattice segment 135 between two corresponding ribs 120 and then inserting second portion 135B between the two corresponding ribs 120, axially positioned relative to first portion 135A.

Figure 6:
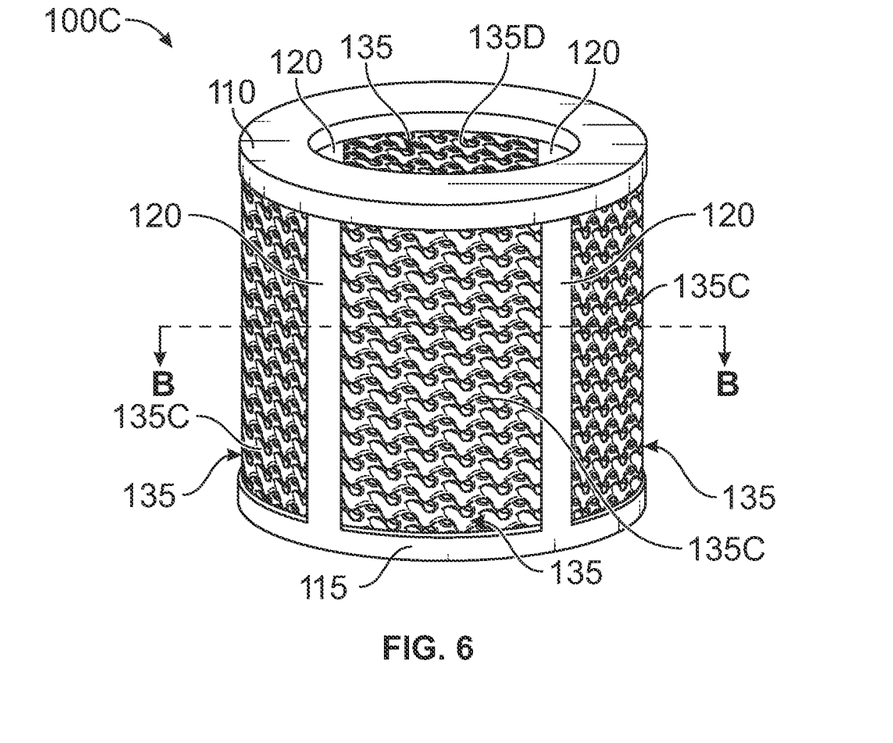
FIG. 6 illustrates a perspective view of a third example trim assembly that can be used in the control valve of FIG. 1.
Figure 7:
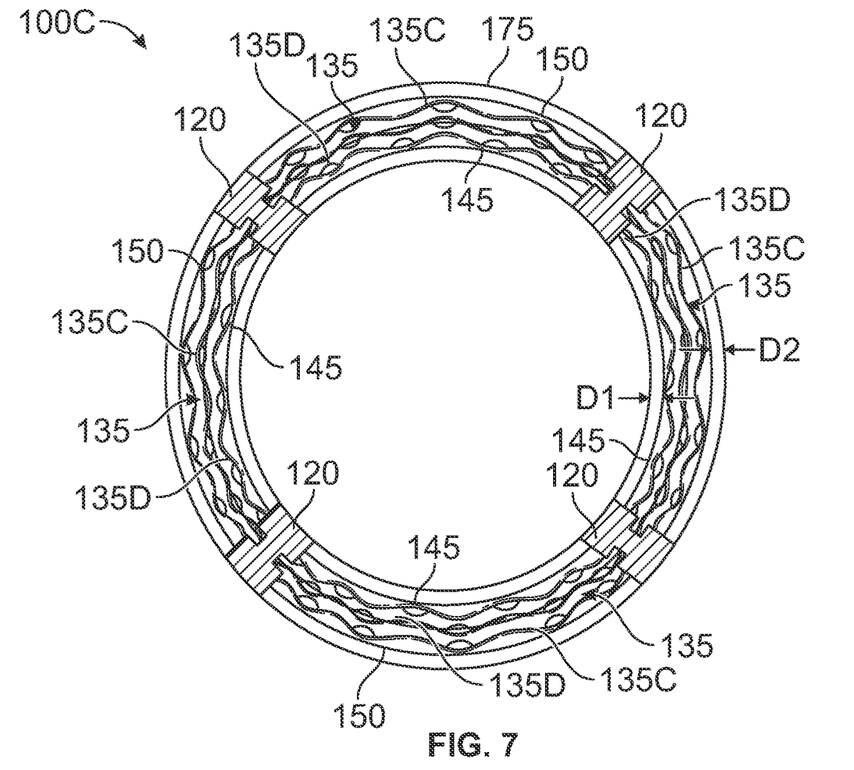
FIG. 7 illustrates a cross-sectional view of the trim assembly of FIG. 6 taken along line B-B of FIG. 6.

Referring to FIGS. 6-7, a third example trim assembly 100C is shown that can be used with control valve 10 to condition the flow of fluid through control valve 10. Trim assembly 100C is the same as trim assembly 100A except that each lattice segment 135 includes a first portion 135C and a radially positioned second portion 135D. First portion 135C can provide a first fluid conditioning and second portion 135D can provide a second fluid conditioning, different than the first fluid conditioning. Alternatively, first portion 135C and second portion 135D could provide the same fluid conditioning, for example, to create a lattice segment 135 that having a greater width.

Second portion 135D could be a separate lattice portion that is positioned adjacent first portion 135C or could be manufactured integral with first portion 135C. In addition, although shown with a first portion 135C and a second portion 135D, there could be as many radially positioned portions as appropriate for a given application.

Trim assembly 100C is assembled much the same as trim assembly 100A described above (see FIG. 12), except that lattice segments 135 are inserted into the first trim section by inserting first portion 135C of lattice segment 135 between two corresponding ribs 120 and then inserting second portion 135D between the two corresponding ribs 120, radially positioned relative to first portion 135C.

Alternatively, the lattice segment of the trim assembly could include both axially positioned portions and radially positioned portions together in various combinations, depending on the particular application.

Figure 8:
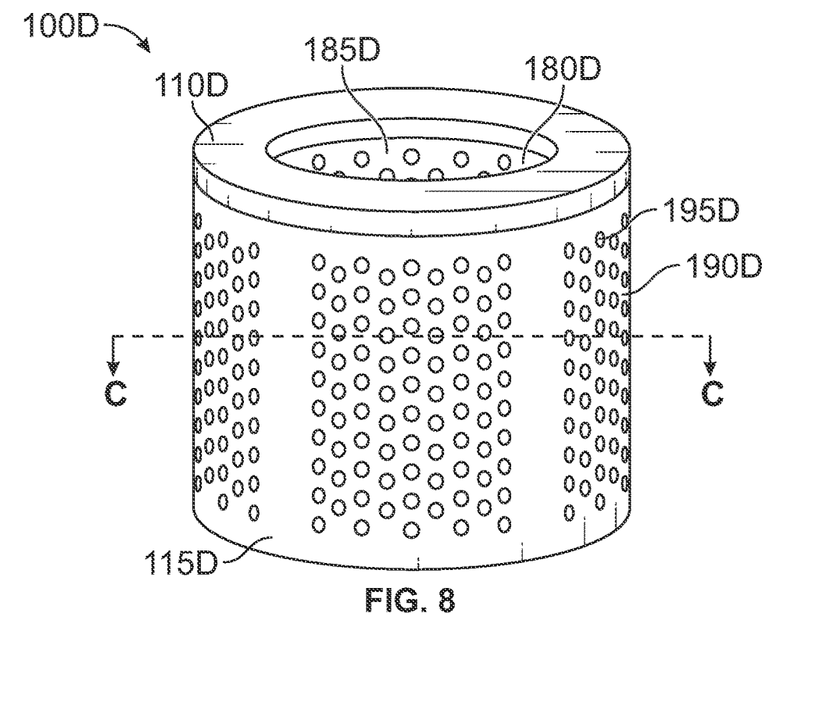
FIG. 8 illustrates a perspective view of a fourth example trim assembly that can be used in the control valve of FIG. 1.
Figure 9:
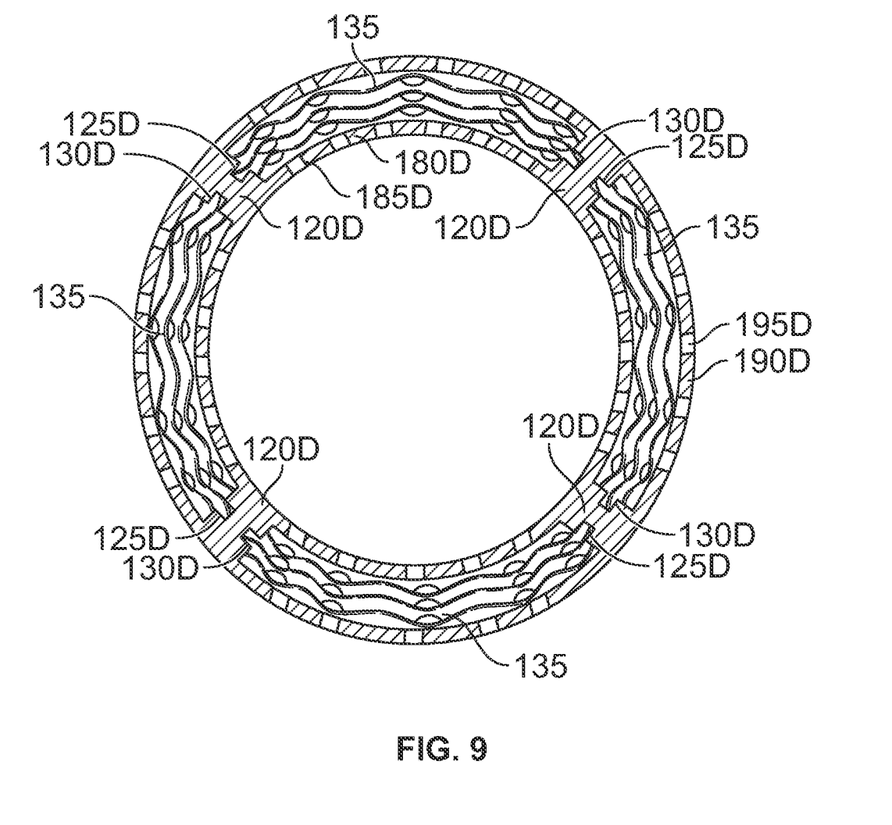
FIG. 9 illustrates a cross-sectional view of the trim assembly of FIG. 8 taken along line C-C of FIG. 8.

Referring to FIGS. 8-9, a fourth example trim assembly 100D is shown that can be used with control valve 10 to condition the flow of fluid through control valve 10 by reducing noise, turbulence, and cavitation. Trim assembly 100D generally includes a top portion 110D, a bottom portion 115D, opposite top portion 110D, an inner wall 180D that extends between top portion 110D and bottom portion 115D, an outer wall 190D that extends between top portion 110D and bottom portion 115D, and a plurality of ribs 120D extending between top portion 110 and bottom portion 115 and between inner wall 180D and outer wall 190D. Inner wall 180D includes a plurality of holes 185D that extend through inner wall 180D to allow fluid flow through inner wall 180D and outer wall 190D has a plurality of holes 195D to allow fluid flow through outer wall 190D. In the example shown, bottom portion 115D, inner wall 180D, outer wall 190D, and ribs 120D are a single, integral, unitary part and top portion 110D is removably secured to ribs 120D. Alternatively, top portion 110D, inner wall 180D, outer wall 190D, and ribs 120D could be a single, integral, unitary part and bottom portion 115D could be removably secured to ribs 120D. In addition, top portion 110D, bottom portion 115D, inner wall 180D, outer wall 190D, and ribs 120 could each be separate parts and both top portion 110D and bottom portion 115D could be removably secured to ribs 120D.

A plurality of arcuate lattice segments 135, as described above, are removably secured between top portion 110D, bottom portion 115D, inner wall 180D, and outer wall 190D, and each of the plurality of lattice segments 135 is separated from adjacent lattice segments 135 by one of the ribs 120D. As described above, to align and secure lattice segments 135 between adjacent ribs 120D, each lattice segment 135 includes a first longitudinally extending protrusion 160 extending along a first side 155 of lattice segment 135 and a second longitudinally extending protrusion 170 extending along a second side 165 of lattice segment 135 and each rib 120D includes a first slot 125D extending longitudinally along a first side of rib 120D and a second slot 130D extending longitudinally along a second side of rib 120D, opposite first side. First and second longitudinal protrusions 160, 170 are configured to engage first slot 125D and second slot 130D on adjacent ribs 120D (e.g., first longitudinal protrusion 160 would engage first slot 125D in rib 120D located adjacent first side 155 of lattice segment 135 and second longitudinal protrusion 170 would engage second slot 130D in another rib 120D located adjacent second side 165 of lattice segment 135). Rather than first and second longitudinally extending protrusions 160, 170 being on lattice segments 135 and first and second slots 125D, 130D being on ribs 120D, the longitudinally extending protrusions could be on ribs 120D and the slots could be formed in lattice segments 135.

To assemble trim assembly 100D, a plurality of lattice segments 135 are first inserted into a first trim section. The first trim section includes a base portion, an inner wall 180D, an outer wall 190D, and a plurality of ribs 120 extending from the base portion and each lattice segment 135 is configured to be removably inserted between inner wall 180D, outer wall 190D, and two corresponding ribs 120D and is separated from adjacent lattice segments 135 by a rib 120D. As discussed above, the first trim section could be bottom portion 115D, with inner wall 180D, outer wall 190D, and ribs 120D secured to or integrally and unitarily formed with bottom portion 115D or the first trim section could be top portion 110D, with inner wall 180D, outer wall 190D, and ribs 120D secured to or integrally and unitarily formed with top portion 110D. Once the lattice segments 135 have been inserted into the first trim section, a second trim section is removably secured to the first trim section (e.g., via threaded members, threaded engagement, shrink fit, guide/engagement features held in place by a clamping load, a seal weld, a tack weld, etc.) such that the lattice segments 135 are removably secured between the first trim section and the second trim section and between inner wall 180D and outer wall 190D.

Figure 10:
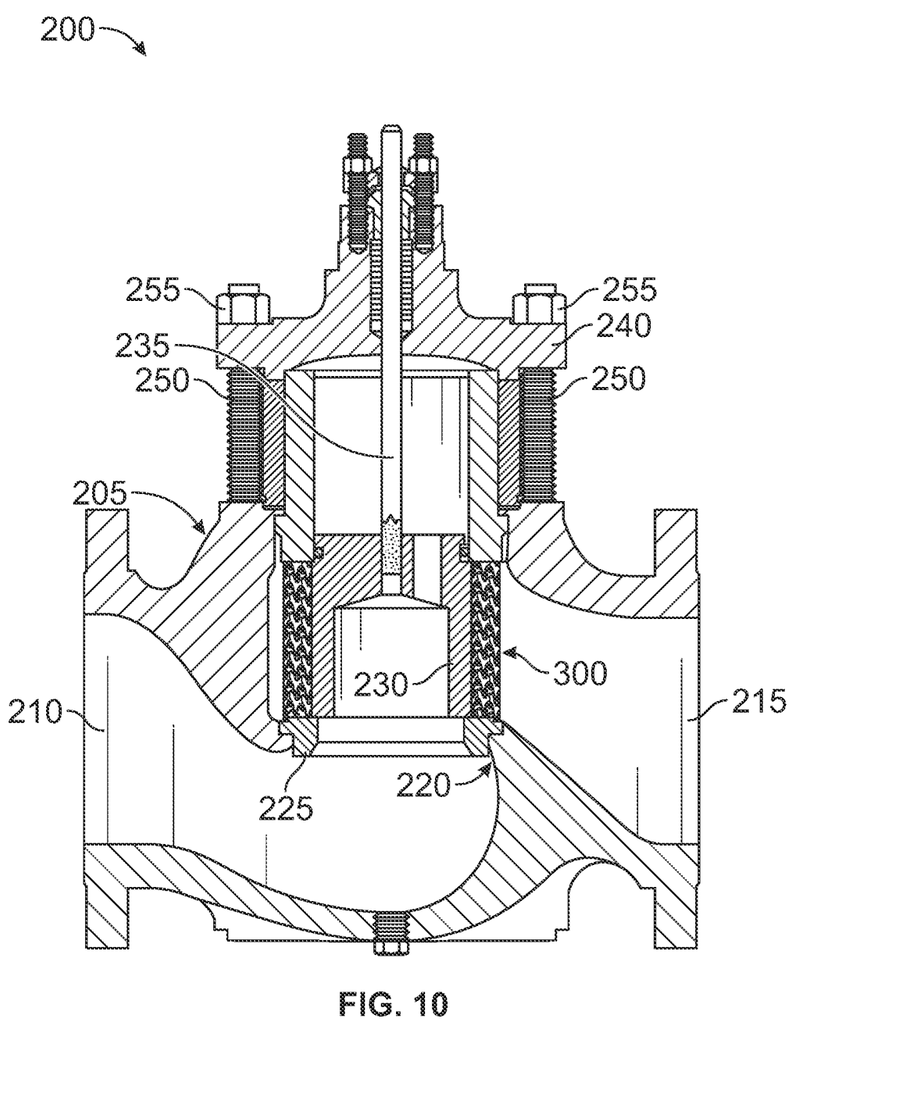
FIG. 10 illustrates a cross-sectional view of a second example control valve.

Referring to FIG. 10, a second example control valve 200 is shown, which in the example shown in a sliding stem control valve. Control valve 200 generally includes a body 205 having an inlet 210, an outlet 215, and a passageway 220 disposed between inlet 210 and outlet 215. A valve seat 225 is disposed in passageway 220 between inlet 210 and outlet 215. A fluid control member, such as valve plug 230, is positioned within body 205 and interacts with valve seat 225 to control fluid flow through body 205, such that valve plug 230 is movable between a closed position in which valve plug 230 sealingly engages valve seat 225 and an open position in which valve plug 230 is spaced away from valve seat 225. A trim assembly 300 is disposed within body 205 to provide guidance for valve plug 230 and to condition a flow of fluid through control valve 200. A stem 235 is connected to valve plug 230 at one end and to an actuator (not shown) at another end. The actuator controls movement of valve plug 230 within trim assembly 300. A top cover 240 is secured to body 205, for example via threaded members 245 and nuts 250, and secures trim assembly 300 within control valve 200 by clamping trim assembly 300 between valve seat 225 and top cover 240.

Figure 11:
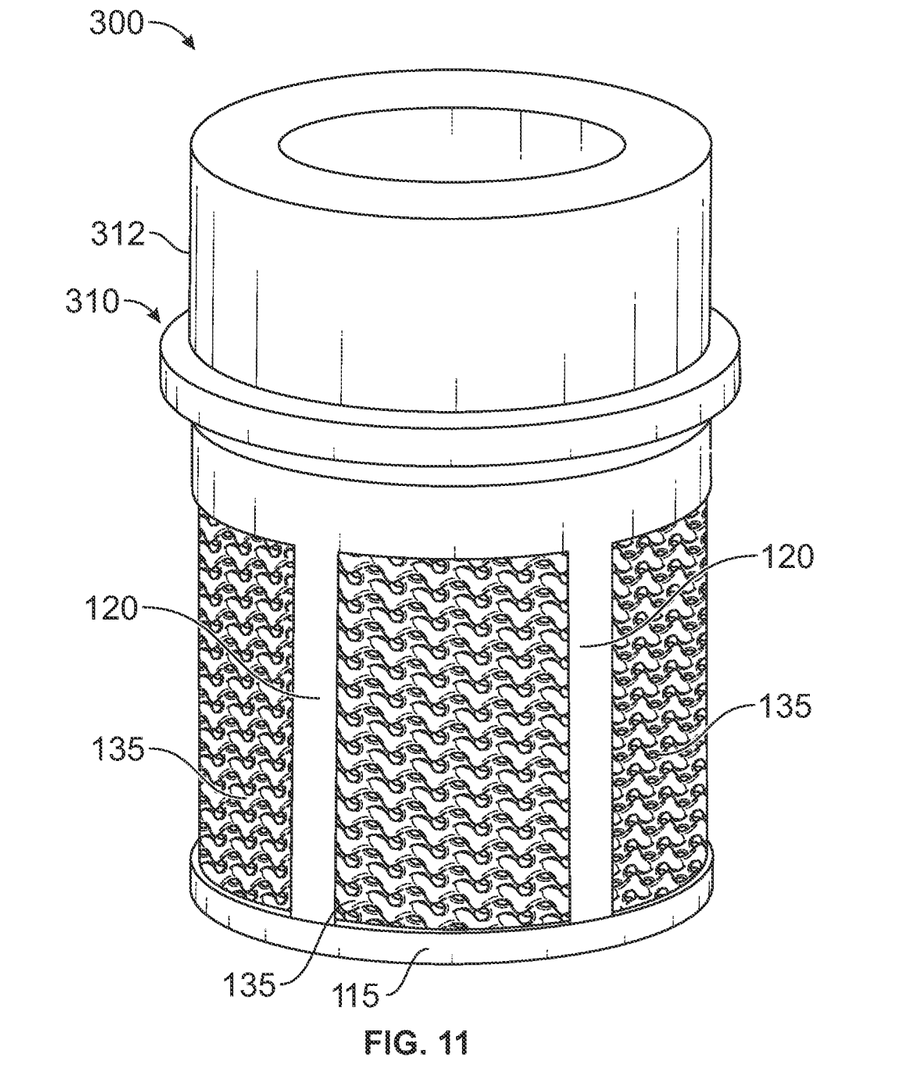
FIG. 11 illustrates a perspective view of a fifth example trim assembly that can be used in the control valve of FIG. 10.

Referring to FIG. 11, a fifth example trim assembly 300 is shown that can be used with control valve 200 to condition the flow of fluid through control valve 200 by reducing noise, turbulence, and cavitation. Trim assembly 300 is the same as trim assembly 100 except that in trim assembly 300, top portion 310 includes an integral, unitary, axially extending plug guide 312, rather than a separate plug guide 50, as described above.

The figures and description provided herein depict and describe a preferred embodiment for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the methods and components disclosed herein without departing from the spirit and scope defined in the appended claims.

What is claimed is:

1. A control valve, comprising:
a body having an inlet and an outlet;
a valve seat positioned in a passageway of the body between the inlet and the outlet;
a valve plug positioned within the body and movable between a closed position, in which the valve plug sealingly engages the valve seat, and an open position, in which the valve plug is spaced away from the valve seat; and
a trim assembly disposed within the body to provide guidance for the valve plug and to condition a flow of fluid through the control valve, the trim assembly comprising:
a top portion and a bottom portion, opposite the top portion;
a plurality of ribs extending between the top portion and the bottom portion, wherein the plurality of ribs and one of the top portion or the bottom portion are a single, integral, unitary piece; and
a plurality of arcuate lattice segments, each lattice segment of the plurality of lattice segments having a plurality of passages that extend between an inner surface of the lattice segment and an outer surface of the lattice segment, and each lattice segment being removably secured between the top portion and the bottom portion and separated from adjacent lattice segments by a rib of the plurality of ribs;
wherein each of the plurality of ribs comprises a first slot on a first side of the rib and a second slot on a second side of the rib, opposite the first side; and
wherein each of the plurality of lattice segments comprises a first longitudinal protrusion extending along a first side of the lattice segment and a second longitudinal protrusion extending along a second side of the lattice segment, the first and second longitudinal protrusions being radially offset from the inner surface of the lattice segment and the outer surface of the lattice segment and configured to engage the first slot and the second slot in adjacent ribs.

2. The control valve of claim 1, wherein:
each of the plurality of lattice segments comprises a first slot on a first side of the lattice segment and a second slot on a second side of the lattice segment, opposite the first side; and
each of the plurality of ribs comprises a first longitudinal protrusion extending along a first side of the rib and a second longitudinal protrusion extending along a second side of the rib, the first and second longitudinal protrusions configured to engage the first slot and the second slot in adjacent lattice segments.

3. The control valve of claim 1, wherein the inner surface of each of the plurality of lattice segments is recessed from an inner diameter of the trim assembly such that the valve plug does not engage the inner surface.

4. The control valve of claim 1, wherein each of the plurality of lattice segments includes a first portion configured to provide a first fluid conditioning and an axially positioned second portion configured to provide a second fluid conditioning, different than the first fluid conditioning.

5. The control valve of claim 1, wherein each of the plurality of lattice segments includes a first portion configured to provide a first fluid conditioning and a radially positioned second portion configured to provide a second fluid conditioning, different that the first fluid conditioning.

6. The control valve of claim 1, wherein the bottom portion and the plurality of ribs are a single, integral, unitary piece.

7. The control valve of claim 1, wherein the top portion includes an axially extending cylindrical plug guide extending from a top surface of the top portion.

8. A trim assembly for a control valve, the trim assembly comprising:
a top portion and a bottom portion, opposite the top portion;
a plurality of ribs extending between the top portion and the bottom portion, wherein the plurality of ribs and one of the top portion or the bottom portion are a single, integral, unitary piece; and
a plurality of arcuate lattice segments, each of the plurality of lattice segments having a plurality of passages that extend between an inner surface of the lattice segment and an outer surface of the lattice segment, and each of the plurality of lattice segments being removably secured between the top portion and the bottom portion, and separated from adjacent lattice segments by a rib of the plurality of ribs;

wherein each of the plurality of ribs comprises a first slot on a first side of the rib and a second slot on a second side of the rib, opposite the first side; and wherein each of the plurality of lattice segments comprises a first longitudinal protrusion extending along a first side of the lattice segment and a second longitudinal protrusion extending along a second side of the lattice segment, the first and second longitudinal protrusions being radially offset from the inner surface of the lattice segment and the outer surface of the lattice segment and configured to engage the first and second slots in adjacent ribs.

9. The trim assembly of claim 8, wherein:

each of the plurality of lattice segments comprises a first slot on a first side of the lattice segment and a second slot on a second side of the lattice segment, opposite the first side; and each of the plurality of ribs comprises a first longitudinal protrusion extending along a first side of the rib and a second longitudinal protrusion extending along a second side of the rib, the first and second longitudinal protrusions configured to engage the first and second slots in adjacent lattice segments.

10. The trim assembly of claim 8, wherein the inner surface of each of the plurality of lattice segments is recessed from an inner diameter of the trim assembly.

11. The trim assembly of claim 8, wherein each of the plurality of lattice segments includes a first portion configured to provide a first fluid conditioning and an axially positioned second portion configured to provide a second fluid conditioning, different than the first fluid conditioning.

12. The trim assembly of claim 8, wherein each of the plurality of lattice segments includes a first portion configured to provide a first fluid conditioning and a radially positioned second portion configured to provide a second fluid conditioning, different that the first fluid conditioning.

13. The trim assembly of claim 8, wherein the bottom portion and the plurality of ribs are a single, integral, unitary piece.

14. The trim assembly of claim 8, wherein the top portion includes an axially extending cylindrical plug guide extending from a top surface of the top portion.

15. A method of assembling a trim assembly for a control valve, the method comprising the steps of:

inserting a plurality of lattice segments into a first trim section, wherein the first trim section includes a base portion and a plurality of ribs extending from the base portion, the plurality of ribs and the base portion are a single, integral, unitary piece, each of the plurality of lattice segments has a plurality of passages that extend between an inner surface of the lattice segment, and each of the plurality of lattice segments is configured to be removably inserted between two corresponding ribs of the plurality of ribs and is separated from adjacent lattice segments by a rib of the plurality of ribs; and securing a second trim section to the first trim section such that the plurality of lattice segments are removably secured between the first trim section and the second trim section;

wherein each of the plurality of ribs comprises a first slot on a first side of the rib and a second slot on a second side of the rib, opposite the first side; and wherein each lattice segment comprises a first longitudinal protrusion extending along a first side of the lattice segment and a second longitudinal protrusion extending along a second side of the lattice segment, the first and second longitudinal protrusions being radially offset from the inner surface of the lattice segment and the outer surface of the lattice segment and configured to engage the first and second slots in adjacent ribs.

16. The method of claim 15, wherein:

each of the plurality of lattice segments comprises a first slot on a first side of the lattice segment and a second slot on a second side of the lattice segment, opposite the first side; and each rib comprises a first longitudinal protrusion extending along a first side of the rib and a second longitudinal protrusion extending along a second side of the rib, the first and second longitudinal protrusions configured to engage the first and second slots in adjacent lattice segments.

17. The method of claim 15, wherein each of the plurality of lattice segments includes a first portion configured to provide a first fluid conditioning and an axially positioned second portion configured to provide a second fluid conditioning, different than the first fluid conditioning.

18. The method of claim 15, wherein each of the plurality of lattice segments includes a first portion configured to provide a first fluid conditioning and a radially positioned second portion configured to provide a second fluid conditioning, different that the first fluid conditioning.

* * * * *